H. T. HERR.
COMBINATION GEARING AND THRUST BEARING.
APPLICATION FILED JULY 26, 1915.
1,272,041. Patented July 9, 1918.
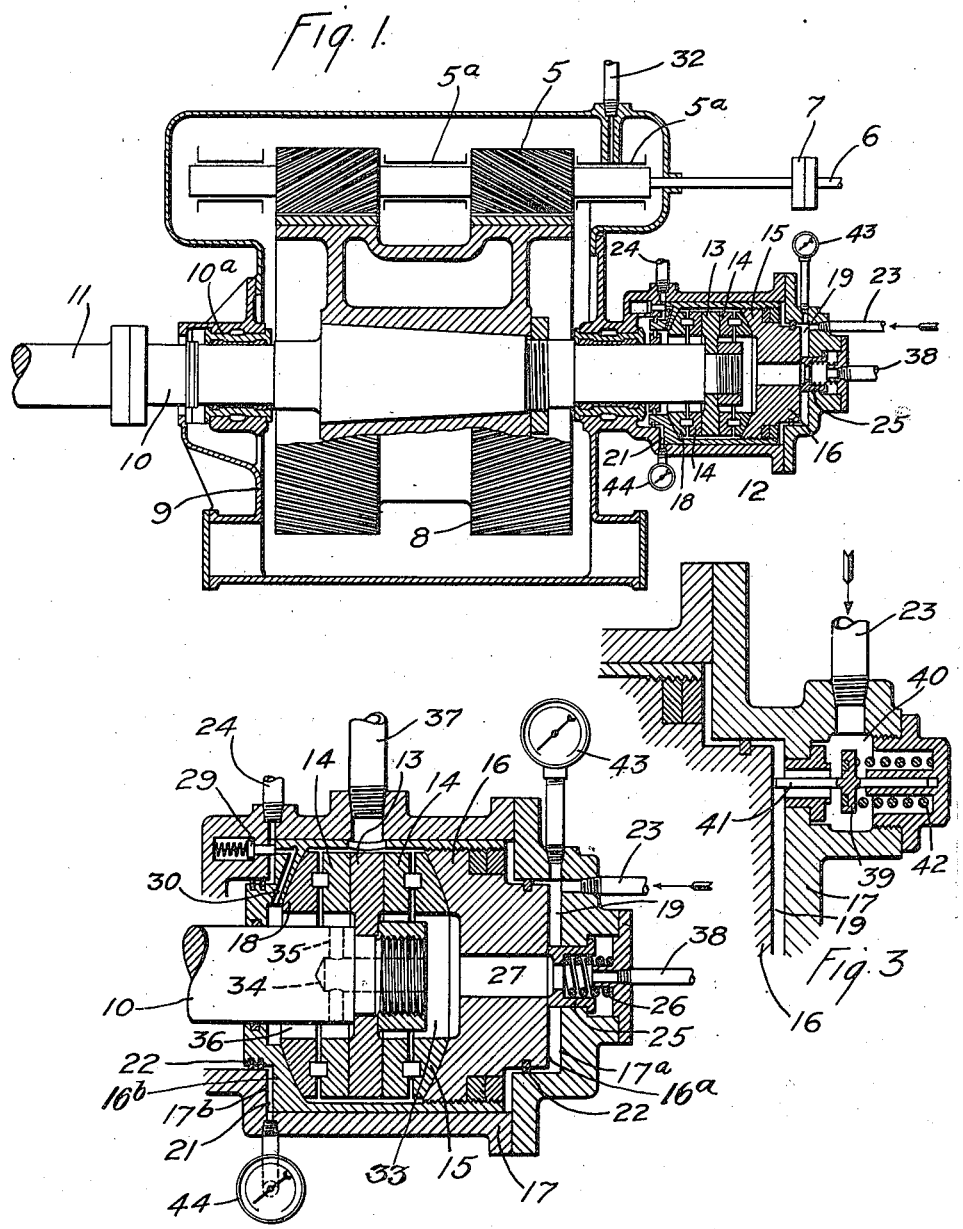

UNITED STATES PATENT OFFICE.

HERBERT T. HERR, OF PITTSBURGH, PENNSYLVANIA, ASSIGNOR TO WESTINGHOUSE ELECTRIC & MANUFACTURING COMPANY, A CORPORATION OF PENNSYLVANIA.

COMBINATION GEARING AND THRUST-BEARING.

1,272,041.  Specification of Letters Patent.  Patented July 9, 1918.

Application filed July 26, 1915. Serial No. 41,928.

*To all whom it may concern:*

Be it known that I, HERBERT T. HERR, a citizen of the United States, and a resident of Pittsburgh, in the county of Allegheny and State of Pennsylvania, have made a new and useful Invention in Combination Gearing and Thrust-Bearing, of which the following is a specification.

This invention relates to gear driven apparatus particularly to marine turbine installations of the type in which one or more turbine units are connected to a driven agent, such as a propeller, by means of a gearing.

An object of the invention is to produce an improved reduction gearing which is provided with means for counter-balancing the end thrust occasioned by the propeller or agent driven by the gearing.

A further object is to produce a gearing provided with means for indicating the thrust imparted to it by the driven agent.

A further object is to produce a new and improved reduction gearing provided with a pneumatic or hydraulic thrust bearing in which means are employed for automatically varying the effective pneumatic or hydraulic pressure, delivered to the thrust bearing, in accordance with variations in the thrust imparted to the gearing by the agent driven by it.

These and other objects which will be made apparent throughout the further description of the invention are obtained by means of apparatus embodying the features herein described and illustrated.

In the drawings accompanying and forming a part hereof, Figure 1 is a vertical sectional view of a reduction gearing embodying my invention.

Figure 1 is a vertical sectional view of a reduction gearing embodying my invention.

Fig. 2 is a horizontal sectional view of a thrust bearing similar to the thrust bearing illustrated in vertical section in Fig. 1.

Fig. 3 is a fragmental sectional view of a thrust bearing and illustrates a pressure control valve which may be employed in connection with thrust bearings such as shown in Figs. 1 and 2.

In marine installations, it is necessary to absorb or counterbalance the axial or longitudinal thrust of the propellers, and for this reason each propeller shaft is always provided with a thrust block or thrust bearing which is usually arranged as a separate unit, and transmits the propeller thrust to the ship's hull through an independent seating. Such a construction involves a considerable waste of space and increases the weight and cost of the installation, since separate seatings are required for the turbine or propelling agent for the reduction gearing employed between the turbine and the propeller, and for the thrust block or thrust bearing.

An object of the present invention is to provide a gearing of improved construction which shall avoid the above noted disadvantages.

One of the features of the present invention is that the thrust bearing and the reduction gearing are combined into an organized apparatus, such that a single seating is employed and such that the organized apparatus absorbs or counterbalances the axial or longitudinal thrust imparted to the gearing by the propeller, while the propeller is being driven in each direction.

Another feature of the invention is that an improved type of thrust bearing is employed to which counterbalancing liquid or fluid under pressure is delivered and is varied in intensity of pressure in response to variations in the thrust imparted to the thrust bearing by the driven agent.

This is accomplished, in the apparatus illustrated by providing a reduction gearing in which the main or driven gear is capable of moving longitudinally or axially, in response to variations in the thrust imparted to it by the driven agent, and in which this axial motion of the gear is employed in controlling the pneumatic or hydraulic pressure delivered to the pressure chambers of the thrust bearing. It is almost universal practice to employ gears having helical gear teeth in reduction gearing transmitting large power, since such teeth are stronger, and since more teeth are simultaneously in mesh than with gears having straight axial teeth. It is also universal practice to provide the gears with two sets of teeth so arranged that the longitudinal or axial thrust occasioned by the axial component of the tooth pressure on one set of teeth, is counterbalanced by the other set. In reduction gearing so equipped it is necessary to so construct the pinion or driving gear that it will move axially with the driven gear in response to the variations in thrust imparted to the driven gear.

Another feature of my invention is therefore, to provide an organized propelling apparatus, of the character described, in which such means are employed for coupling the driving gear to the turbine or propelling agent, that variations in the position of the driving gear will not impart thrust to the turbine or propelling agent.

As illustrated, the apparatus includes a driving pinion 5, which is coupled to a driving shaft 6, by means of a coupling 7, which permits the pinion 5 to occupy different longitudinal positions with relation to its bearings without imparting thrust to the shaft 6. The coupling 7 is similar in construction to the coupling illustrated in an application filed by George Westinghouse on November 16, 1911, and serially numbered 660,659. The pinion 5 meshes with a gear 8, which is mounted in suitable bearings 10ª, provided on a frame or casing 9 for both the gear and the pinion. The pinion and the gear are both provided with two sets of oppositely inclined helical teeth, and the bearings 5ª of the pinion are shown mounted on the frame or casing 9.

One end of the shaft 10 of the gear 8 is operatively connected to a driven agent, such as a propeller shaft 11. The other end of the shaft is provided with a thrust bearing which is generally indicated by the numeral 12, and which is mounted on or within the frame or casing 9. The thrust bearing illustrated, consists of a rotatable disk 13, rigidly mounted on the shaft 10, and located between two sets of thrust imparting segments 14; one set of which is adapted to transmit the thrust of the shaft 10 to a thrust imparting ring 15. The ring 15 in turn imparts the thrust to a longitudinally movable but non-rotatable member 16, located within a casing 17, which is mounted on or forms a part of the frame or casing 9 of the reduction gearing. The other set of thrust imparting members 14 operates between the disk 13 and a thrust imparting ring 18, which, like the ring 15, imparts thrust to the member 16. For convenience in assembling the apparatus, the member 16 is formed in two parts, as is shown in Fig. 2, and is provided at one end with a cylindrical projection of reduced diameter, which forms, with the casing 17, a pressure chamber 19. A similar chamber 21 is formed between the other end of the member 16 and the casing 17, and suitable packings 22 are provided between the member 16 and the casing for sealing the pressure chambers.

Fluid or liquid, such as oil under pressure, is delivered to the chamber 19 through a pipe or passage 23, and to the chamber 21 through a pipe or passage 24. The effective pressure of the liquid in each of the chambers is regulated by a discharge valve, which is controlled in its operation by variations in the position of the member 16, with relation to the casing 17; or by variations in the longitudinal thrust imparted to the member 16 by the driven agent 11 through the disk 13.

The discharge of high pressure oil from the chamber 19 is controlled in the apparatus illustrated in Figs. 1 and 2 by means of a hollow valve 25, which is normally pressed against a shoulder formed on the casing 17, by means of a spring 26, and is adapted to seat upon the adjacent end face of the member 16, and to control the flow of oil from the chamber 19 through a passage 27 formed within the member 16. As the member 16 moves from left to right, in Figs. 1 and 2, in response to thrust imparted by the driven agent 11, it moves into engagement with the valve 25, and thereby closes communication between the chamber 19 and the passage 27. This causes pressure to build up in the chamber 19, and to exert a counter-thrust on the member 16 in opposition to that imparted to it by the agent 11. This oil pressure in the chamber 19 also tends to move the member 16 from right to left and to establish communication between the chamber 19 and the discharge passage 27. With this arrangement a position of equilibrium is established for each thrust of the agent 11 in which the valve 25 is either fully closed or is open a sufficient amount to permit a flow from the chamber just sufficient to maintain the necessary oil pressure within the chamber to counterbalance the thrust.

The delivery of oil or liquid under pressure to the chamber 21 is similarly controlled by means of a plunger valve 29, which is mounted on the casing 17 and is adapted to close a discharge port 30, formed within the member 16.

In the apparatus illustrated, the chamber 21 is adapted to counterbalance the thrust of the propeller shaft 11, when it is driven in the reverse direction. Under such conditions the thrust or pull exerted by the agent 11 moves the member 16 so that it engages the valve 29 and closes the port 30. Oil pressure thereupon builds up in the chamber 21 and moves the member 16 to such a position that equilibrium is established, by proportioning the flow of oil through the passage 30 to the amount of thrust imparted by the agent 11.

It will be understood that the valves 25 and 29 need not necessarily be fully closed when the member 16 moves in response to the thrust imparted by the driven agent 11, and that equilibrium may, and in most instances will, be established prior to the complete closing of the valves.

In the apparatus illustrated, I have provided means such that the thrust bearing will not be rendered inoperative by failure of the oil pressure to counterbalance the thrust in either direction. As illustrated, the casing 17 is provided with shoulders or thrust faces 17ª and 17ᵇ, which are respectively adapted to be engaged by shoulders or faces 16ª and 16ᵇ formed on the member 16 in case the oil pressure fails or the pressure chambers 19 and 21 fail to perform their functions.

High pressure oil or liquid may be delivered to the pipes 23 and 24 from any suitable source, such for example, as the bearings 5ª of the pinion 5. In Fig. 1, I have shown one bearing 5ª provided with a delivery passage or pipe 32, which is adapted to communicate with both of the pipes 23 and 24. It will, of course, be understood that each of the bearings of the pinion may be similarly equipped on both sides so that they will be effective in delivering oil under pressure while the pinion is driven in either direction.

As illustrated, the passage 27 terminates in a chamber 33, which is employed for the purpose of lubricating the disk 13. The discharge port 37, of this chamber, is preferably located at the top of the casing 17, as shown in Fig. 2, for the purpose of insuring lubrication of both sides of the disk 13. I have, however, illustrated a passage 34, formed in the end of the shaft 10, and communicating with radially extending passages 35, which are adapted to deliver lubricant from the chamber 33 to a chamber 36, which also communicates with the exhaust port 37. In the drawings, the discharge passage 30 of the chamber 21 is shown communicating with the chamber 36.

I have also provided means for delivering low pressure oil to the passage 27, and consequently to the chambers 33 and 36, so that the disk 13 will receive lubricant independently of the high pressure oil supply. As illustrated, the low pressure oil supply is delivered through a pipe 38 and through the hollow valve 25.

In order to prevent the continuous discharge of high pressure oil from the chamber 19, when the vessel is running astern, and from the chamber 21, when the vessel is running ahead, I may employ a check valve 39, similar to the valve illustrated in Fig. 3, in connection with both the passages 23 and 24. As illustrated, this valve 39 is designed for controlling the delivery of lubricant to the chamber 19, and is located within the chamber 40, intervening between the pipe 23 and the chamber 19. The valve is provided with a stem 41, which is adapted to be engaged by the member 16, and to open the valve as soon as the member 16 moves in response to the thrust occasioned by driving the ship ahead. The valve is so designed that it provides a full port opening when moved only a short distance from its seat, and it is shown provided with a spring 42, for moving it to its seat and for closing communication between the pipe 23 and the chamber 19 when its stem 41 is disengaged by the member 16. With such an arrangement oil from pipe 23 will be cut off from the chamber 19 as soon as the chamber 21 is called into operation, and if the pipe 24 is provided with such a valve the oil supply will be cut off from the chamber 21 while the chamber 19 is in operation.

I have also illustrated means for indicating or recording the thrust imparted to the thrust bearing by the agent 11. As illustrated, the means employed consists of a pressure indicator 43, for indicating the pressure within the chamber 19, and the pressure indicator 44, for indicating the pressure within the chamber 21. For properly calibrating these instruments the thrust transmitted to the bearing may be indicated, or the horse power developed at a given speed may be indicated.

While I have illustrated and described but one embodiment of my invention, it will be apparent to those skilled in the art that various changes, modifications, substitutions and omissions may be made in the apparatus illustrated without departing from the spirit and scope of the invention, as set forth by the appended claims.

What I claim is:

1. In combination with a transmission gearing, a thrust block movably mounted on the casing of the gearing and operatively connected to the main gear of the transmission gearing, and means for restricting the movement of the thrust block.

2. In a geared marine turbine installation of the type indicated, the combination in a single self-contained unit of a gear wheel casing, a main gear wheel, an ahead and astern thrust block movably mounted in the casing, whereby these parts may be attached to the ship's structure by a single seating, and means responsive to the thrust load for restricting the movement of the thrust block.

3. In combination, a transmission gearing comprising a driving gear, a driven gear, a casing for the gears, and an ahead and astern thrust block movably mounted on the casing, and operatively secured to the driven gear, means for limiting the movement of the thrust block by fluid pressure, and means controlled by the thrust load for controlling the effective fluid pressure.

4. In combination, a transmission gearing comprising a driving gear, a driven gear, a thrust bearing operatively secured to the driven gear, and responsive in operation to axial motion of the driven gear, and a driving coupling between the driving agent of the driving gear and the driving gear, whereby said driving gear is capable of moving axially with the driven gear without imparting longitudinal thrust to the driving agent.

5. In geared marine turbine installations, a driving agent, a driven agent, a transmission gearing between said agents comprising a driving gear, and a driven gear operatively connected to the driven agent, and shiftable axially in its bearings in response to variations in longitudinal thrust imparted by said driven agent, a thrust bearing operatively connected to the driven gear and responsive in operation to the variations in the axial position of the driven gear, and a coupling between the driving gear and the driving agent, permitting said driving gear to shift axially without imparting thrust to the driving agent.

6. In combination with a reduction gearing, a main gear shiftable longitudinally in response to variations in axial thrust imparted thereto, a thrust bearing operatively connected to the gearing, and comprising a thrust imparting member, fluid pressure chambers located on opposite sides of said member, means for delivering fluid under pressure to each chamber, and means responsive to variations in the longitudinal position of said member for varying the degree of fluid pressure within the chambers.

7. In combination with a driven gear, shiftable longitudinally in response to variations in axial thrust imparted thereto, a thrust bearing comprising a thrust imparting member operatively connected to the shaft of the gear, a fluid pressure chamber adapted to counterbalance the thrust imparted by said member, means for delivering a substantially constant flow of fluid under pressure to said chamber, and means responsive in operation to variations in the longitudinal position of the gear for varying the discharge of fluid from said chamber.

8. In combination with a reduction gearing, a driven gear, shiftable longitudinally in response to variations in axial thrust imparted thereto, a thrust bearing comprising a thrust imparting member, a pressure chamber for opposing the thrust imparted by said member, means for delivering fluid under pressure to said chamber, and means responsive to variations in the longitudinal position of said thrust imparting member for varying the fluid pressure within said chamber.

9. A thrust bearing, a member movable in response to thrust imparted thereto, a pressure chamber located in said bearing for opposing the motion of said member and means, controlled by said member for controlling the pressure in said chamber.

10. A thrust bearing having a pressure chamber formed therein for opposing the thrust imparted to said member, and means responsive to the thrust imparted to the bearing for varying the pressure in said chamber.

11. In a thrust bearing, a thrust imparting member, means coöperating therewith and subjected to fluid pressure for opposing the thrust in either direction imparted by said member, and means responsive to the thrust imparted by said member for varying the fluid pressure to which the first mentioned means is subjected.

12. In combination, a driving agent, a driven agent, transmission gearing between said agents, comprising a driving gear, and a driven gear operatively connected to the driven agent and shiftable axially within its bearings in response to variations in longitudinal thrust imparted by the driven agent, a coupling between the driving gear and the driven agent permitting the driving gear to shift axially with the driven gear without imparting thrust on the driving agent, and a thrust bearing operatively connected to the shaft of the driven gear and comprising a thrust imparting member movable longitudinally with the driven gear, a fluid pressure chamber for opposing thrust imparted by said member, means for delivering fluid under pressure to said chamber and means responsive to variations in the longitudinal position of said member for varying the fluid pressure within said chamber.

13. In combination, a driving agent, a driven agent, transmission gearing between said agents, comprising a driving gear operatively connected to the driving agent, a driven gear operatively connected to the driven agent and shiftable longitudinally in response to variations in thrust imparted thereto by the driven agent, and a thrust bearing comprising a thrust imparting member operatively connected to the shaft of the driven gear and movable longitudinally therewith, means for opposing longitudinal movement of said member in both directions by means of fluid pressure, and means responsive to longitudinal movement of said member for varying the degree of fluid pressure opposing movement of said member.

14. In combination, a driving agent, a driven agent, a reduction gearing between said agents and comprising a driving gear, a driven gear, shiftable longitudinally in response to axial thrust imparted thereto, and a thrust bearing mounted on the casing of the reduction gearing and comprising a thrust imparting member operatively connected to the shaft of said driven gear, means for opposing longitudinal motion of said member by fluid pressure, and means responsive to the longitudinal movement of said member for varying the degree of pressure of the opposing fluid.

15. In combination, a driving agent, a driven agent, a reduction gearing between said agents and comprising a driving gear, a driven gear shiftable longitudinally in response to axial thrust imparted thereto by the driven agent, and a thrust bearing mounted on the casing of the gearing and comprising a thrust imparting member operatively connected to the shaft of the driven gear, means for opposing longitudinal motion of the member by fluid pressure, and a valve responsive in operation to the movement of said member for varying the degree of fluid pressure opposing motion of said member.

In testimony whereof, I have hereunto subscribed my name this 23rd day of July, 1915.

HERBERT T. HERR.

Witnesses:
C. W. McGHEE,
E. W. McCALLISTER.